Figure 5:
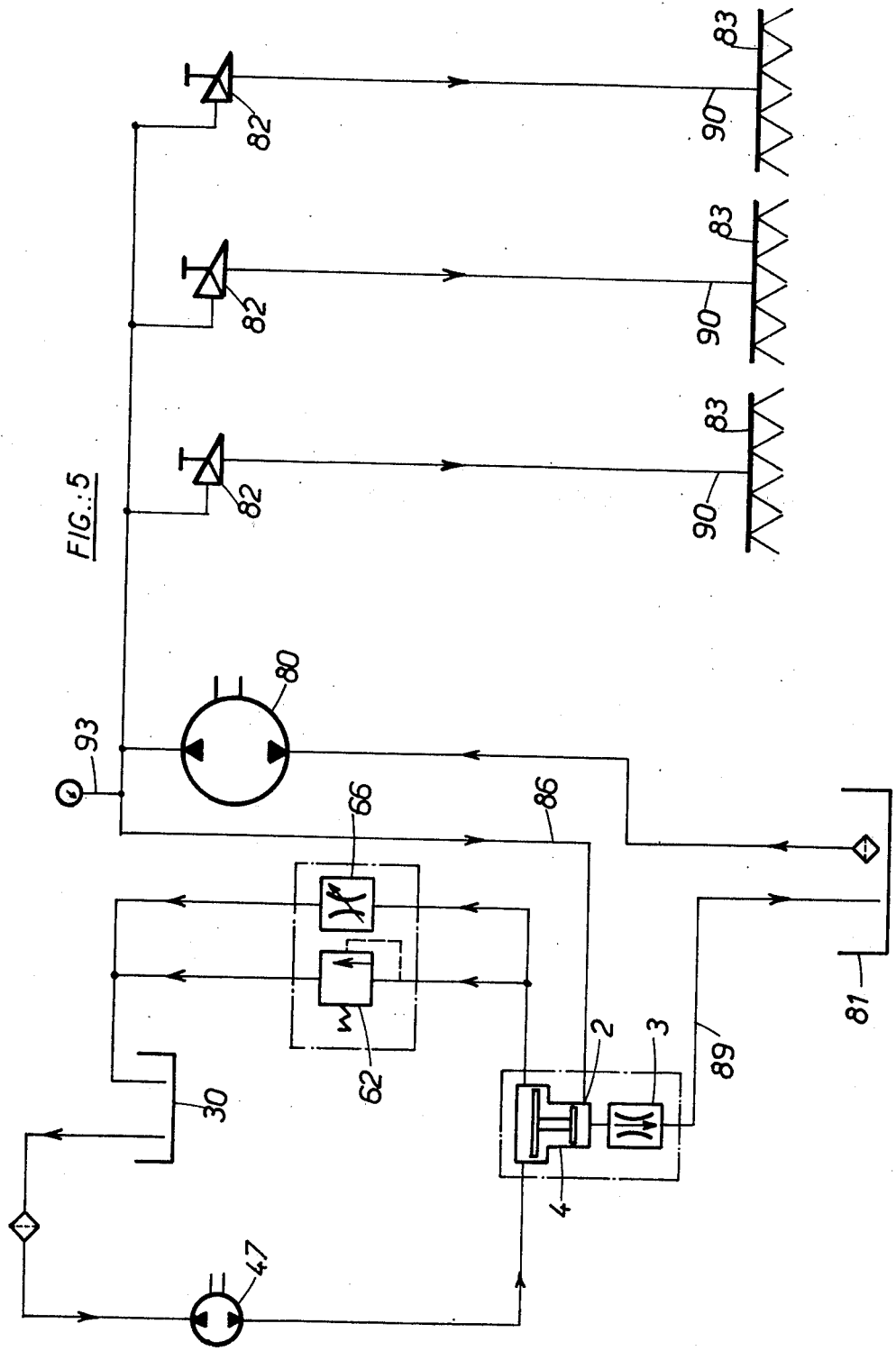

United States Patent [19]

Ballu

[11] 4,193,547
[45] Mar. 18, 1980

[54] MOBILE APPARATUS FOR SPREADING LIQUIDS AT A CONSTANT VOLUME PER UNIT SURFACE AREA

[75] Inventor: Vincent P. M. Ballu, Epernay, France

[73] Assignee: Tecnoma, Epernay, France

[21] Appl. No.: 945,790

[22] Filed: Sep. 25, 1978

[30] Foreign Application Priority Data

Sep. 26, 1977 [FR] France ............................ 77 28895

[51] Int. Cl.$^2$ .............................................. B05B 9/06
[52] U.S. Cl. .................................... 239/156; 222/614
[58] Field of Search .......................... 239/62, 155–157; 222/614, 621; 251/208

[56] References Cited

U.S. PATENT DOCUMENTS

| | | | |
|---|---|---|---|
| 2,080,272 | 5/1937 | Hollman | 251/208 |
| 3,266,728 | 8/1966 | Hallberg | 239/155 |
| 3,518,953 | 7/1970 | Johnston | 239/156 X |
| 3,670,962 | 6/1972 | Johnston | 222/614 X |

FOREIGN PATENT DOCUMENTS

| | | | |
|---|---|---|---|
| 2607386 | 3/1977 | Fed. Rep. of Germany | 239/155 |
| 89906 | 7/1967 | France . | |
| 89962 | 8/1967 | France | 239/157 |
| 2185940 | 1/1974 | France . | |

*Primary Examiner*—Robert W. Saifer
*Attorney, Agent, or Firm*—Watson, Cole, Grindle & Watson

[57] ABSTRACT

Mobile apparatus for spreading a constant volume of liquid per unit area of surface in spite of variations in speed of travel, has a spreading liquid circuit which includes a pressure regulator for controlling the liquid pressure in response to the pressure in an auxiliary liquid circuit. The pressure in the auxiliary liquid circuit is controlled by a sensing wheel which is carried on a pivotally mounted arm so that the sensing wheel can engage either with a wheel of the vehicle on which the apparatus is mounted or with the ground. The sensing wheel provides a pump for the auxiliary circuit and the flow rate of the pump is controlled by an orifice which can be partially occluded by a cam-like shutter.

7 Claims, 6 Drawing Figures

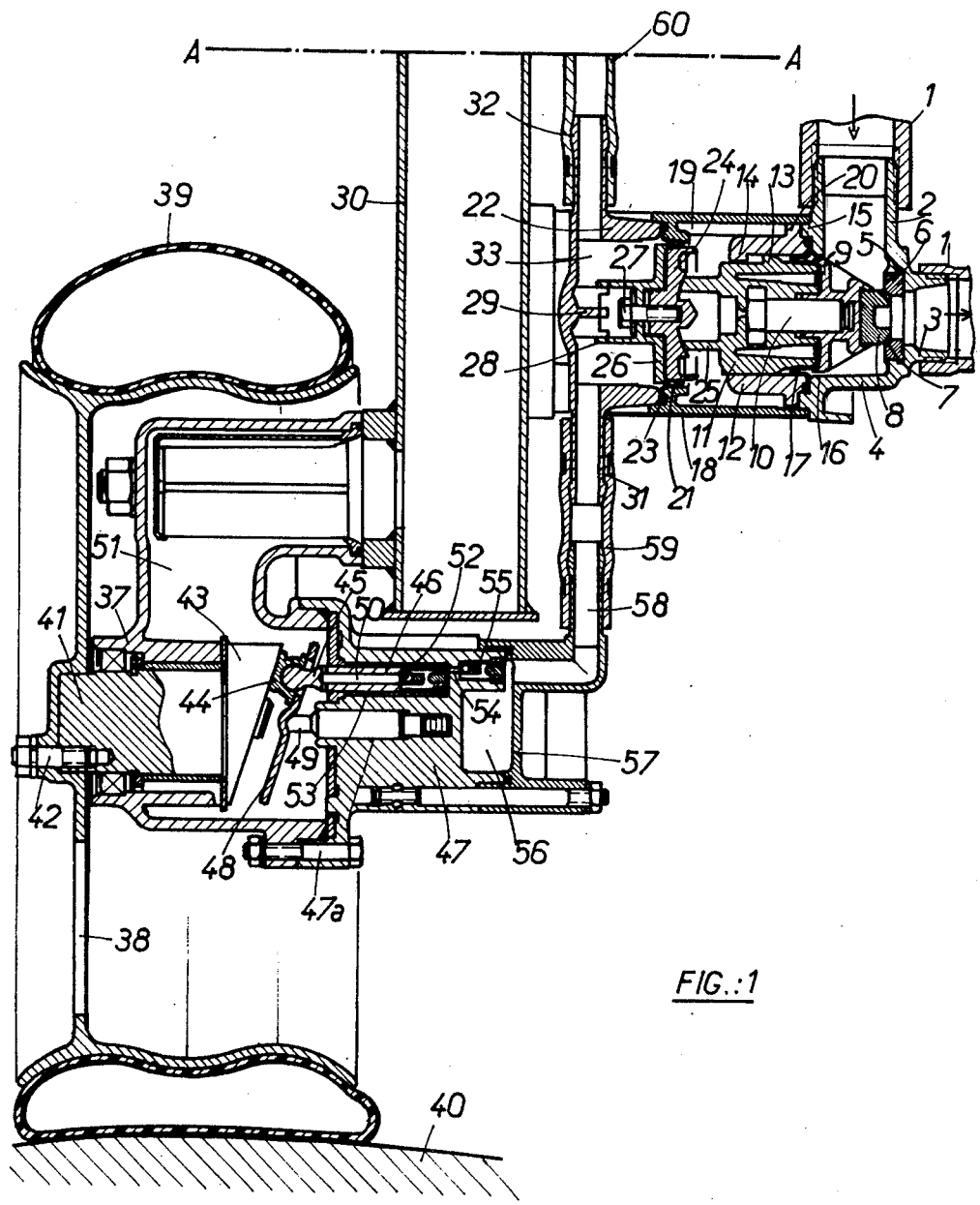
FIG.:1

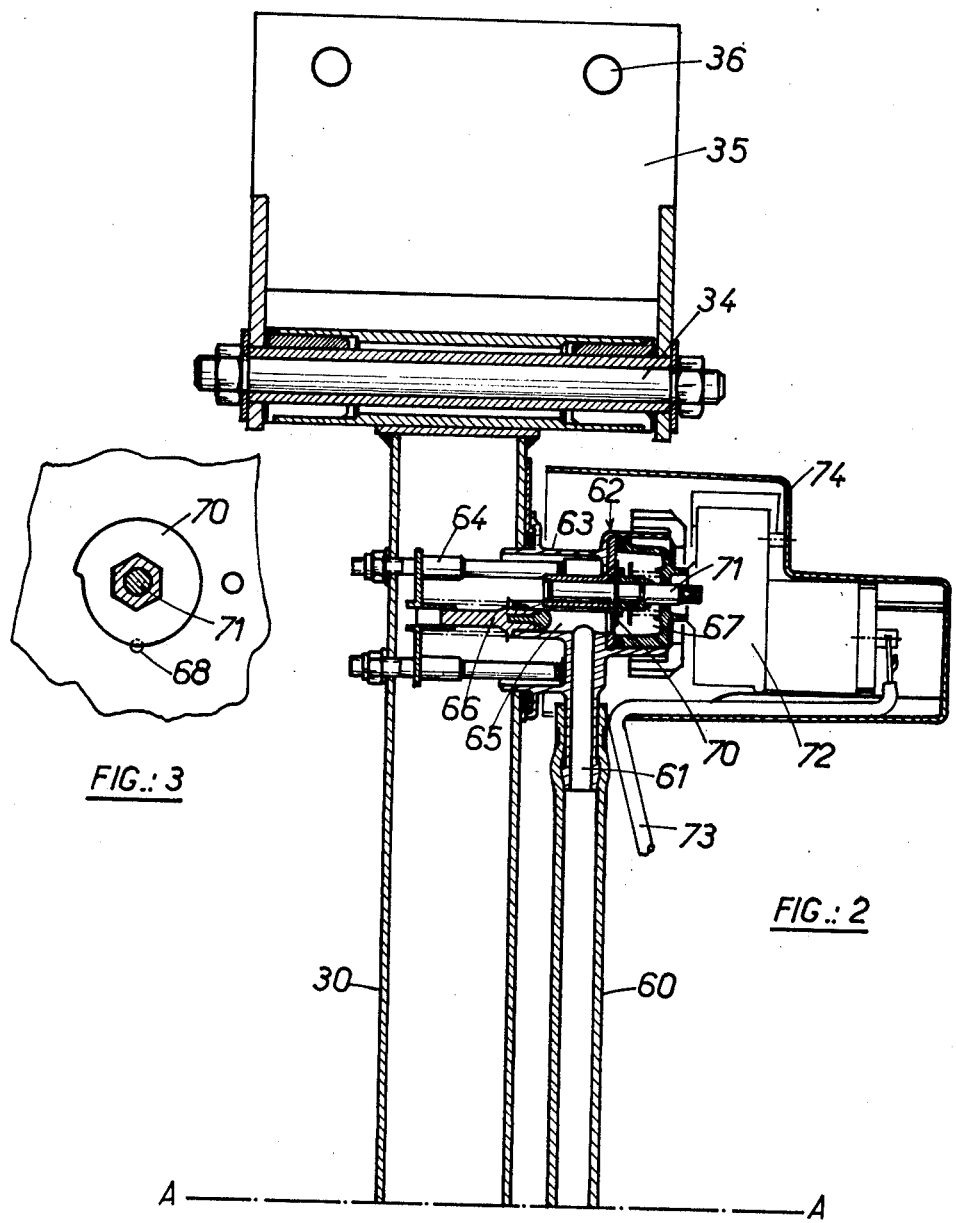

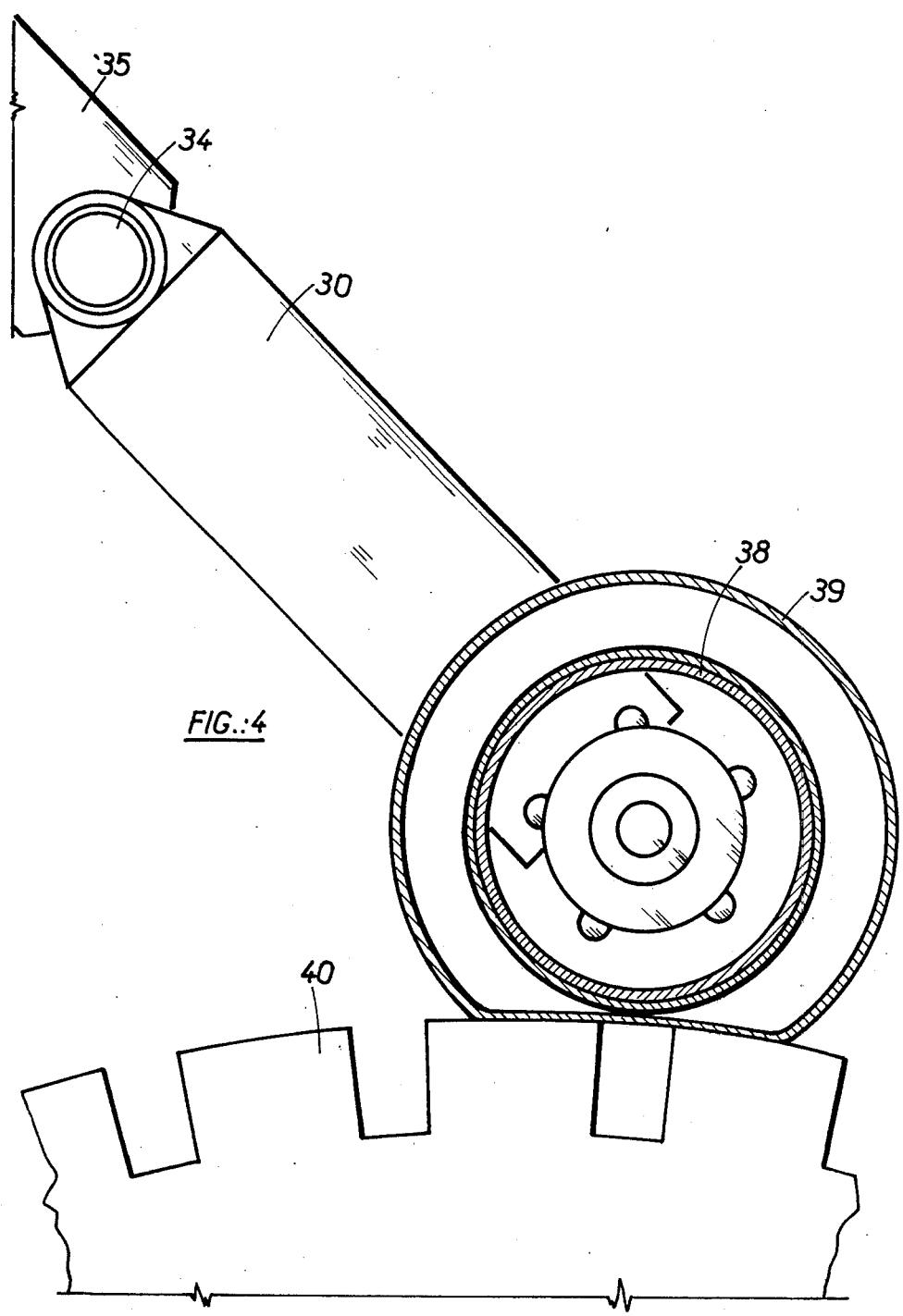

MOBILE APPARATUS FOR SPREADING LIQUIDS AT A CONSTANT VOLUME PER UNIT SURFACE AREA

This invention relates to mobile apparatus for spreading liquids, for example products intended for treating crops and soils, which enables a controlled constant volume of liquid to be spread per unit area of surface treated, even though the speed of travel of the apparatus along the surface may vary between considerable limits.

In known devices of this type, the spreading circuit comprises a pressure regulator for the liquid which is made responsive to the speed of travel of the device by means of an auxiliary liquid circuit including a pump whose rotational speed is proportional to the speed of travel and a calibrator with regulatable flow rate. However these devices are generally relatively complicated, both structurally and from an installation point of view, and do not function reliably and accurately.

An object of the invention is to provide apparatus of the above type which can easily be adapted to all kinds of liquid spreading devices, which may be self-propelled, towed or carried by a tractor. Another object is to provide apparatus of this type which is compact and robust and the operation of which is reliable and accurate.

According to one aspect of the invention, there is provided mobile apparatus for spreading a constant volume of liquid per unit area of surface in spite of variations in speed of travel, comprising a spreading liquid circuit including a pressure regulator for regulating the liquid pressure in the spreading circuit in response to an auxiliary liquid circuit, the auxiliary circuit being installed in a pivotally mounted arm which carries a sensing wheel adapted to be rotated by engagement with its periphery at a speed proportional to the speed of travel to control the liquid pressure in the auxiliary circuit.

The pivotally mounted arm, which is advantageously tubular and arranged to serve as a reservoir for the auxiliary circuit liquid is easy to install on any device or vehicle, the sensing wheel being kept in contact with, for example, a wheel of the spraying device, a wheel of the tractor, or even with the ground.

The power absorbed by the auxiliary circuit is very small, for example, of the order of a hundredth of that which is absorbed by the spreading ciruit. Thus, there is no danger of the sensing wheel skidding.

The different elements making up the auxiliary circuit form, with the pressure regulator, a robust assembly which is easy to maintain.

Since the spreading circuit features spraying elements furnished with holes in thin-walled material, the auxiliary circuit features a throughput calibrator also furnished with a hole or orifice in a thin-walled member, thus providing the same flow rate/pressure relationship.

According to another aspect of the invention, there is provided mobile apparatus for spreading a constant volume of liquid per unit area of surface in spite of variations in speed of travel comprising a spreading liquid circuit including a pressure regulator for regulating the liquid pressure in the spreading circuit in response to an auxiliary liquid circuit which is responsive to the speed of travel, is equipped with a flow rate calibrator furnished with an orifice in a wall of thin sheet material and a regulating member of thin sheet material for the aperture of the said orifice.

Thus, the regulation does not affect the flow rate/pressure ratio and functioning is reliable and accurate.

Figure 6:
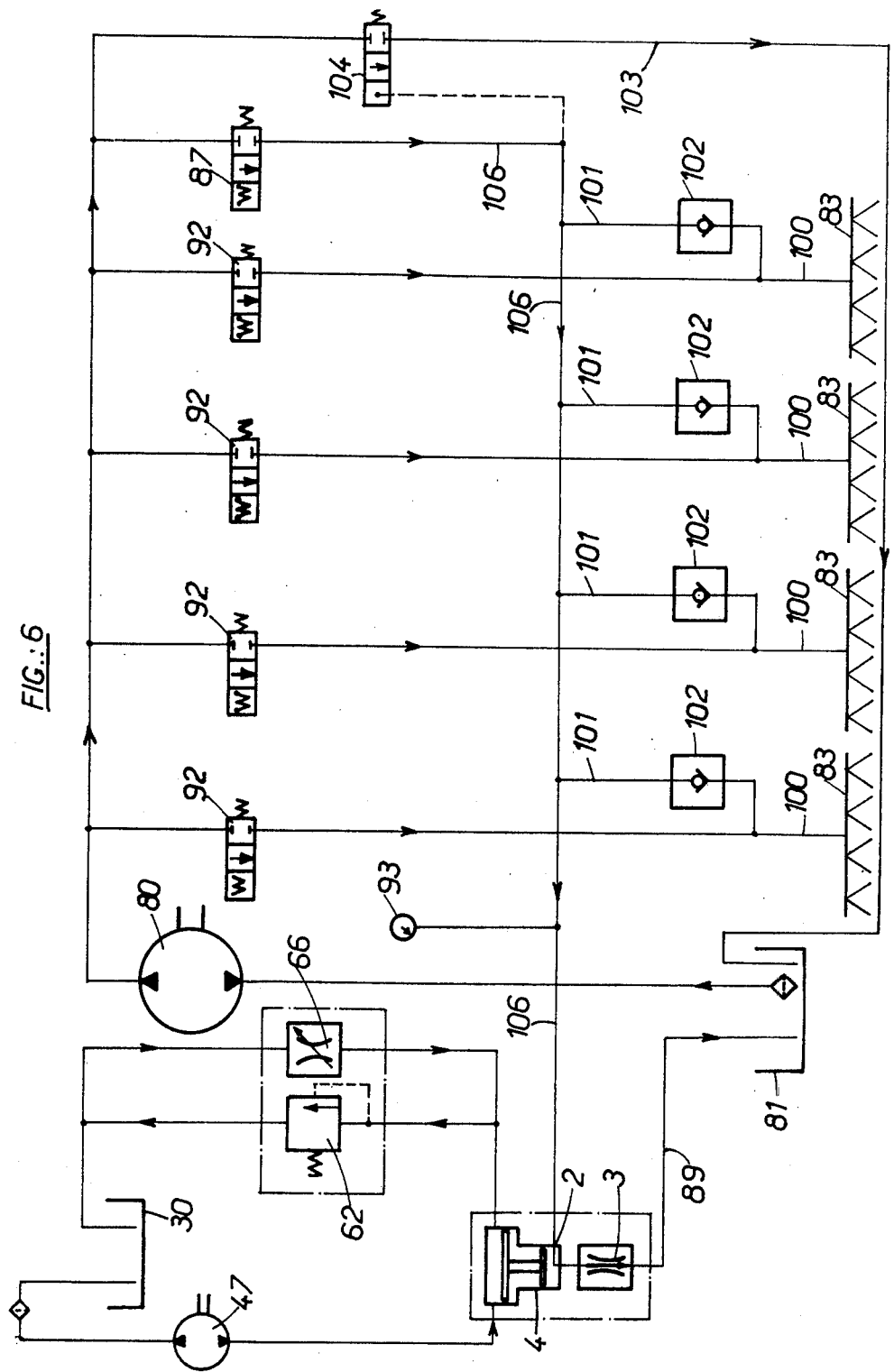

Embodiments of the invention will now be described, by way of example, with reference to the accompanying drawings, in which:

FIG. 1 and FIG. 2, when joined together at the line A—A, show a pressure regulation device for apparatus in accordance with the invention in longitudinal section, FIG. 3 is a detail view of the shutter of the flow rate calibrator of the embodiment shown in FIGS. 1 and 2, FIG. 4 is a schematic side view showing the sensing wheel of the device applied to the wheel of a spraying device to which the device is linked, and FIGS. 5 and 6 are schematic views of alternative liquid circuits of spraying apparatus according to the invention incorporating pressure regulation devices as shown in FIGS. 1 and 2.

In the embodiment shown in FIGS. 1 to 4, ducts of a spreading circuit 1 are connected to an inlet tube 2 and an outlet tube 3 of a pressure regulator 4, the two tubes 2 and 3 being disposed at right angles to one another (FIG. 1).

At the entrance to the outlet tube 3, a groove 5 is provided into which an annular seating member 6 is fitted against whose truncated conical opening 7 a sealing element 8 with a matching profile can engage.

The sealing element 8 is integral with a fitting 9 which is attached by a recessed screw 10 to a piston 11. The piston 11 can slide in a cylinder 12 which is coaxial with the tube 3, abutments 13 and 14 limiting the stroke of the piston 11 in the cylinder 12.

The cylinder 12 is held fixed in a rebate formed by an annular projection 15 which surrounds a bore 16 in the regulator body 4 in which the fitting 9 and the adjacent part of the piston 11 can slide freely, an annular sealing membrane 17 being trapped by its outer edge between the fitting 9 and the piston 11 so as to prevent any leakage of liquid.

The cylinder 12 is held in place by a cylindrical sleeve 18 which is fitted over it and on the annular projection 15 as well as by ribs 19 which engage between a flange 20 of the said cylinder and an internal peripheral rib 21 of the sleeve 18.

In the end of the sleeve 18 adjacent to the rib 21, there is engaged the edge of a casing 22 with the interposition of the outer rim of a flexible annular membrane 23. The inner edge of the membrane 23 is trapped between a support 24, against which an annular extension 25 of the piston 11 abuts, and a guide piece 26 attached to the support 24 by means of a screw 27.

The guide piece 26 has a cylindrical extension 28 which engages on a cruciform guide member 29 formed on the base of the casing 22, coaxially with the cylinder 12 and the piston 11.

The base of the casing 22 is attached to a tubular arm 30 and furnished with two mutually confronting tubes 31 and 32 which open into an annular chamber 33 surrounding the guide member 29. This chamber 33, whose volume is variable, is sealed by the guide piece 26 and the membrane 23.

The arm 30 which is arranged to form a reservoir for a liquid such as oil, is pivotally mounted at one of its ends on an axle 34 (FIG. 2) which is at right angles to it. This axle is mounted in a bracket 35 whose holes permit it to be attached to the apparatus to which the device is to be linked.

At its other end, the arm 30 is furnished with a laterally projecting hollow support 37 (FIG. 1) on to which is fitted a small sensing wheel 38 fitted with a flexible pneumatic tire 39. The rotational axis of the wheel 38 is parallel to the pivotal axis 34. As can be seen in FIG. 4, the tire 39 of the wheel 38 is intended to be pressed against the periphery of another wheel 40 by the action of a spring (not shown). The sensing wheel 38 can alternatively come into direct contact with the ground.

The wheel 40 can be a tractor wheel in the case of tractor-mounted apparatus, or a wheel of the spraying device itself, if the apparatus is to be towed.

The axle 41 of the sensing wheel 38, on which the sensing wheel 38 is held by three screws 42, is attached to a fixed-angle swash plate 43 carrying projections 44 with which engage the spherical ends 45 of the pistons 46 of a volumetric cylinder pump 47. The projections 44 are held in place by a counter plate 48 mounted on an axial pin 49 fitted in the body of the pump 47. This latter is fixed to the support 37 by bolts 47a.

The pistons 46 are hollow and pierced by channels 50 leading from a chamber 51 in the support 37, which communicates with a reservoir formed by the arm 30, to respective suction valves 52 located in the pistons. The cylinders 53 of these pistons 46 are pierced by channels 54 which are furnished with pressure valves 55 and lead to a common chamber 56 in the body of the pump 47. This chamber is closed by a cover 57 from which leads a tube 58 which is connected by a hose 59 to the tube 31 which serves as an inlet pipe for the casing 22.

The other tube 32 of casing 22 is connected by a connection 60 to the inlet tube 61 of a flow rate calibrator 62 (FIG. 2). The calibrator 62 has a casing 63 attached in a sealed manner to the arm 30 with the aid of rods 64 which pass through the arm 30.

The tube 61 ends in a bore 65 which communicates with the arm 30 through a relief valve 66 which is calibrated to prevent accidental excess pressure.

At its other end, the bore 65 communicates with an annular chamber 67 by means of an orifice 68 in a thin plate (FIG. 3), whose open regulation is effected by a cam-like shutter 70 cut from thin sheet material and fixed in a flexible manner to the wall in which the orifice 68 is pierced. This shutter can be moved either manually or, as can be seen in FIG. 2, by its shaft 71 which is rotatable electrically by a reduction gear motor 72 which is powered through a cable 73 so that it can be controlled from the tractor cabin. A hood 74 protects the calibrator and its motor.

Because of the flow rate calibrator 62, the pressure of the liquid in the annular chamber 33 varies in a corresponding manner to that in the spraying circuit. The two pressures are proportionally and simultaneously regulated by modifying the position of the cam 70 in a manner to block or free the orifice 68 to a greater or less degree.

The device which has just been described operates as follows:

The sensing wheel 38 whose pneumatic tire is slightly inflated adheres well to the tire of the wheel 40 in spite of vibrations and unevenesses caused by the tread of the latter. Thus, it turns at a speed proportional to that of the wheel 40 and so to the speed of travel of the apparatus equipped by the device. Because of this, the volumetric pump 47 has a flow rate proportionate to such speed of travel.

The calibrator 62 (FIG. 2) determines the resulting liquid pressure in the chamber 33 (FIG. 1) of the regulator 4 and where, as stated above, the variation of liquid pressure is caused to be equivalent to that of the sprayers by the construction of the apparatus.

Furthermore, the regulator 4 acts as a pressure intensifier because of the difference in diameter of the pistons 26 and 11. Thus, it retransmits the pressure variations, in a predetermined ratio, to the spreading circuit.

The membranes 17 and 23 ensure the separation of the liquid circuits.

Several coupled regulators may be installed in parallel for pumps with very large flow rates.

The application to agricultural sprayers of the system of which the principle has just been described may be carried out in several ways.

Two non-restrictive embodiments will now be described; first, a simple embodiment with manual control and then an embodiment permitting remote control.

In the simple embodiment shown in FIG. 5, where only the essential elements of the auxiliary circuit are shown, a spray pump 80 draws liquid from a reservoir 81 and pumps it into manually controlled gate valves 82 arranged in parallel with a return line 86, furnished with a pressure gauge 93, towards the regulator 4. The gate valves 82 are connected to spray heads 83 by pipes 90.

The liquid which is surplus to the necessary quantity to give the required flow rate for spreading returns to the tank 81 through the regulator 4 which operates under the power of the auxiliary circuit described above and whose output pipe 3 is connected to a pipe 89.

When some of the gate valves 82 are closed, taking into account the regulation pressure adopted, the surplus liquid returns to the regulator 4. When all the gate valves 82 are closed, all the output of the pump returns to the regulator 4.

This simple installation gives a constant spreading density to the extent that the load losses of the valves 82 are negligible, i.e. to the extent that the operating pressure of the entire system is substantially the pressure which exists immediately upstream of the spraying heads 83.

In the remotely controlled installation shown in FIG. 6, a scheme has been adopted which automatically compensates for the pressure losses existing in the circuit which would be liable to interfere with the balance between the auxiliary circuit and the main spraying circuit.

As before, the pump 80 draws the liquid from the tank 81 to pump it to the spraying heads 83, but, in this embodiment, it passes through electrically operated valves 92 which are connected to the spraying heads 83 by pipes 100. Branch pipes 101 equipped with non-return valves 102 connect the spraying heads 83 to the return line 106 which is itself connected to the inlet tube 2 of the regulator 4.

When one of the electrically operated valves 92 is closed, the corresponding line 100, in which the pressure drops, is cut off by the corresponding non-return valve 102 from the pressurised circuit 101, 106.

When all the spraying heads 83 have been closed by the electrically operated valves 92, no liquid is supplied to the return line 106. Consequently the pressure tends to rise upsteam of a valve 104, connected in parallel with the valves 92, which comes off balance and automatically opens, allowing the flow from the pump to run freely back through a line 103 to the reservoir 81.

To regulate the pressure when the electrically operated valves 92 are closed, i.e. when spraying through the heads 83 is not in progress, an electrically operated valve 87 is provided in parallel with the valves 92, which re-establishes the pressure in the circuit 106 by unloading the valve 104 which thereupon closes.

The pressure of the line 106 can be read from a pressure gauge 93.

In operation, the line 106 is supplied with liquid by the branches 101 only, they in turn being connected to spray lines 100 which are thus directly subjected to the action of the regulator 4. Thus, the similarity between the pressure and flow rate values at the calibrator and at the sprayers is not disturbed by the presence of overlong lines or the electrically operated valves 92.

In both the embodiments of FIGS. 5 and 6, the volumetric pump 47, the calibrator 66, the relief valve 62, and the oil reservoir 30 of the pressure regulating device, which have been described in detail with reference to FIGS. 1 to 4, have been shown schematically.

It will be noticed that the spraying pressure is not limited and that its regulation is not affected by slips in the transmission, as the power absorbed by the auxiliary device is extremely low.

It is clear that the embodiments described have only been given as examples and that they can be modified, notably be substituting equivalent techniques, without departing from the scope of the invention as defined in the claims.

I claim:

1. Mobile apparatus for spreading a constant volume of liquid per unit area of surface in spite of variations in speed of travel, comprising a spreading liquid circuit, an auxiliary liquid circuit, a pressure regulator connected in the spreading circuit for regulating the liquid pressure therein in response to said auxiliary liquid circuit, a bracket, a tubular arm pivotally mounted at one end on said bracket, said auxiliary circuit being located in said arm, said arm being adapted to serve as a reservoir for the liquid of the auxiliary circuit, a sensing wheel mounted on said arm, adapted to be rotated by engagement with its periphery at a speed proportional to the speed of travel and coupled to the auxiliary circuit to control the liquid pressure therein, a hollow support at the other end of the tubular arm on which the sensing wheel is mounted and a pump mounted on the support and adapted to be directly driven by the sensing wheel, the hollow support providing communication between the pump and the reservoir in the arm.

2. Apparatus according to claim 1, wherein the pump has a cylinder coaxial with the axis of the sensing wheel, hollow pistons located in said cylinder and distributed around said axis, a liquid chamber arranged in the hollow support and communicating with said hollow pistons, and an oblique swash plate for controlling the pistons.

3. Apparatus according to claim 1, including a flow rate calibrator connected to the reservoir, also carried by the oscillating arm and connected to the pressure regulator which, in turn is connected to the pump.

4. Mobile apparatus for spreading a constant volume of liquid per unit of surface in spite of variations in speed of travel, an auxiliary liquid circuit, a pressure regulator connected in the spreading circuit for regulating the liquid pressure therein in response to said auxiliary liquid circuit, a pivotally mounted arm in which said auxiliary circuit is installed, a sensing wheel mounted on said arm, adapted to be rotated by engagement with its periphery at a speed proportional to the speed of travel and coupled to the auxiliary circuit to control the liquid pressure therein, said pressure regulator comprising a chamber connected to the auziliary liquid circuit, a cylinder communicating at one end with said chamber and, at the other end, with the liquid spreading circuit, and a piston having an integral seal located in the cylinder with the seal facing the spreading circuit, the surface are of the piston in contact with the auxiliary circuit liquid being greater than that within contact with the spreading circuit liquid, whereby this piston serves to intensify the pressure between the auxiliary circuit and the spreading circuit.

5. Mobile apparatus for spreading a constant volume of liquid per unit area of surface in spite of variations in speed of travel, comprising a spreading liquid circuit, an auxiliary liquid circuit, a pressure regulator connected in the spreading circuit for regulating the liquid pressure therein in response to said auxiliary liquid circuit, a pivotally mounted arm in which said auxiliary is installed, a sensing wheel mounted on said arm, adapted to be rotated by engagement with its periphery at a speed proportional to the speed of travel and coupled to the auxiliary circuit to control the liquid pressure therein, said spreading circuit including a common pump, a plurality of spreading elements, a respective supply-line for each spreading element fed in parallel by said common pump, a respective gate valve for each supplyline, a common return line connected to each supply line by a respective branch line, and a respective non-return valve in each branch line, the branch lines being connected to the respective supply lines between the spreading element and the corresponding gate valve and the pressure regulator being connected to the return line.

6. Apparatus according to claim 5, including a further gate valve connecting the return line to the common pump in parallel with the supply lines, the further gate valve permitting measurement and regulation of pressure to be effected without opening the gate valves of the said supply lines.

7. Apparatus according to claim 5, further comprising an automatic valve arranged to provide an auxiliary return path in the event of closure of all the feed pipes of the spreading elements.

* * * * *